United States Patent [19]

Tadokoro et al.

[11] 4,138,229
[45] Feb. 6, 1979

[54] CLEANING TAPE FOR MAGNETIC HEAD

[75] Inventors: Eiichi Tadokoro; Masahiro Utumi; Masaaki Fujiyama, all of Odawara; Satoru Takayama, Tokyo, all of Japan

[73] Assignee: Fuji Photo Film Co., Ltd., Minami-ashigara, Japan

[21] Appl. No.: 844,027

[22] Filed: Oct. 20, 1977

[30] Foreign Application Priority Data

Dec. 21, 1976 [JP] Japan .............................. 51-153657

[51] Int. Cl.² .......................... B24D 3/00; G11B 5/41
[52] U.S. Cl. ...................................... 51/398; 51/295; 51/298 R; 274/47; 360/128
[58] Field of Search ............ 51/394, 398, 401, 281 R, 51/328, 295, 298; 274/47; 15/210, 97, 256.51; 360/128, 137, 134

[56] References Cited

U.S. PATENT DOCUMENTS

| | | | |
|---|---|---|---|
| 3,069,815 | 12/1962 | Valentine | 51/398 |
| 3,266,878 | 8/1966 | Timmer | 51/298 |
| 3,383,191 | 5/1968 | Thomas | 51/298 |
| 3,476,537 | 11/1969 | Markotan | 51/298 X |
| 3,978,520 | 8/1976 | Nowicki | 274/47 X |

Primary Examiner—Nicholas P. Godici
Attorney, Agent, or Firm—Harold L. Stults

[57] ABSTRACT

A cleaning tape used for cleaning the surface of a magnetic recording head of a tape recorder or the like consists of a substrate and a cleaning layer. The cleaning layer contains two kinds of particles. One kind of particles has a small diameter and a high hardness, and the other has a large diameter and a low hardness.

10 Claims, 1 Drawing Figure

U.S. Patent
Feb. 6, 1979
4,138,229
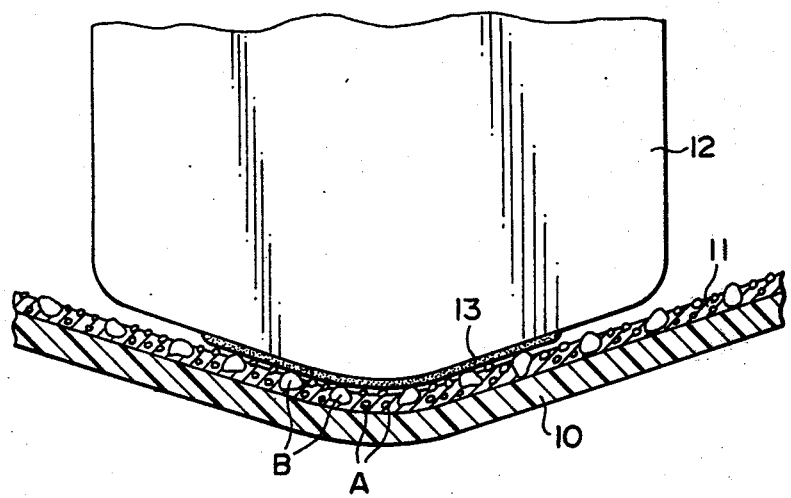

CLEANING TAPE FOR MAGNETIC HEAD

BACKGROUND OF THE INVENTION

1. Field of the Invention

This invention relates to a cleaning tape for cleaning a magnetic recording head of a magnetic tape recorder or the like, and more particularly to an improvement in the material used in the cleaning layer of a magnetic head cleaning tape.

2. Description of the Prior Art

In a magnetic tape recorder a video tape recorder, video sheet recorder or the like, the magnetic recording material which coats the magnetic recording medium such as a magnetic tape or sheet is partly shaved off by the sticks on the surface of the magnetic recording head (hereinafter referred to simply as "magnetic head") of the recorder during the play thereof. Further, dust in the atmosphere also sticks on the magnetic head during play. The shaved off magnetic recording material and the dust adhering to the magnetic head will deteriorate the quality of the sound or image recorded on the magnetic recording tape or sheet.

In order to remove the extraneous material stuck on the magnetic head, it has been known to use a cleaning tape. The cleaning tape is used in the recorder in the same way as a normal recording tape. While the cleaning tape is in use in the recorder, the surface of the cleaning tape rubs the surface of the magnetic head and abrades the surface to remove the material stuck thereon.

Japanese Utility Model Public Disclosure No. 55808/1975 discloses a cleaning tape to be used for this purpose in which paper is laminated on a substrate of tape. This tape is disadvantageous in that the cleaning effect is insufficient. Since the binder constituting the magnetic layer of the tape or sheet is very sticky, the recording material stuck on the magnetic head is hard to remove. Therefore, it is very difficult to adequately remove the material by the cleaning tape having a paper layer. Further, in this type of cleaning tape, the fiber of the paper is liable to stick on the magnetic tape or sheet, and this causes dropout in the signal recording or reproduction.

Japanese Patent Public Disclosure No. 40504/1975 discloses a cleaning tape which carries on its substrate a cleaning layer containing particles having a diameter of 0.05 to $3\mu$ dispersed in a binder. This cleaning tape abrades the material stuck on the surface of the magnetic head with the hard particles contained in the cleaning layer thereof. Therefore, this type of cleaning tape has a sufficient cleaning effect. However, since the particles contained are very hard, the surface of the magnetic head itself is scratched thereby. The scratches formed on the surface of the magnetic head in turn scratch the magnetic tape or sheet and the sensitivity and S/N ratio of the recording tape or sheet are apt to be lowered. The formation of the scratches can be prevented by using particles of comparatively low hardness. However, if the hardness is too low, the cleaning effect cannot be made sufficiently high. It is, therefore, very difficult to find the optimum hardness of the particles in this type of cleaning tape.

SUMMARY OF THE INVENTION

In view of the defects inherent in the conventional cleaning tape, the primary object of the present invention is to provide a cleaning tape for removing extraneous material stuck on the magnetic head which has a sufficient cleaning effect and which does not scratch the surface of the magnetic head.

The cleaning tape in accordance with the present invention is characterized in that the cleaning layer carried on a substrate thereof contains two kinds of particles having different diameters and different hardnesses. The particles of the first kind have a diameter of not more than $5\mu$ Mohs hardness of not less than 5.5. The particles of the second kind have a diameter of 6 to $200\mu$ and Mohs hardness of not more than 5. The first kind of particles has a smaller diameter and higher hardness than the second kind, and the second kind of particles has a larger diameter and lower hardness than the first kind. By the second kind of particles having a larger diameter and lower hardness, the pressure of contact between the first kind of particles having a higher hardness and the surface of the magnetic head is lessened. Therefore, the magnetic head is prevented from being scratched. The material stuck on the magnetic head with a high sticking force can be abraded by the first kind of particles having higher hardness. The material stuck on the magnetic head which is easily removable can be removed by the second kind of particles. Thus, the cleaning tape in accordance with the present invention has a high cleaning effect.

BRIEF DESCRIPTION OF THE DRAWING

A single FIGURE is a longitudinal sectional view of a cleaning tape in accordance with the present invention shown together with a magnetic head bearing extraneous material stuck thereon to be removed.

DESCRIPTION OF THE PREFERRED EMBODIMENT

Now the present invention will be described in detail with reference to the accompanying drawing. As shown in the drawing, the cleaning tape in accordance with the present invention consists of a substrate 10 and a cleaning layer 11 carried thereon. The cleaning layer 11 contains A-particles having a diameter of not more than $5\mu$ and Mohs hardness of not less than 5.5, and B-particles having a diameter of 6 to $200\mu$ and Mohs hardness of not more than 5. The A-particles and B-particles are mixed together and dispersed in a binder and applied on the substrate 10 as a cleaning layer 11.

The extraneous material 13 adhering to a magnetic head 12 is abraded and removed by hard the A-particles. Since B-particles of larger diameter and lower hardness are mixed with the A-particles, the pressure of contact between the cleaning tape and the magnetic head 12 is lessened by the B-particles. Thus, the material 13 adhering to the magnetic head 12 can be removed by a small force. Therefore, the magnetic head 12 is not scratched while the material 13 is being removed. In other words, the B-particles function not only to lessen the pressure between the cleaning tape and the magnetic head but also to remove the material sticking on the magnetic head with a comparatively small sticking force.

The cleaning tape may be provided with a back coating layer to facilitate the feed thereof. The back coating layer should preferably have a surface resistance of not more than $10^8$ ohm/cm.

The cleaning tape may be connected to an ordinary magnetic recording tape as a leader tape. In this case, the magnetic head can be cleaned every time the magnetic recording tape is used for recording or reproduction.

As the substrate 10 may be used various kinds of plastic film such as polyester film of polyethylene terephthalate (PET) or polyethylene-2,6-naphthalate, film of polyolefine or polypropylene, and cellulose derivative film of cellulose diacetate, cellulose triacetate, cellulose acetate butylate, or cellulose acetate propionate.

The diameter of the A-particles should be not more tha $5\mu$ and preferably be 0.1 to $1\mu$ from considerations of the cleaning effect and the probability of scratching. If the diameter of the A-particles is too large, the magnetic head is apt to be scratched thereby, and if it is too small the cleaning effect is lowered. The Mohs hardness thereof should be not less than 5.5 and preferably be not less then 6.

As the A-particles can be used $SnO_2$, $SiO_2$, $Fe_2O_3$, $Fe_3O_4$, $TiO_2$, $GeO_2$, $CrO_3$, $Al_2O_3$, $B_4C$, $SiC$, $ZrO_2$ and $ThO_2$.

Since the A-particles are hard, they are used together with B-particles which have a larger diameter and lower hardness. The diameter of the B-particles should be 6 to $200\mu$ and should preferably be 50 to $100\mu$. If the diameter of the B-particles is too large, the surface of the cleaning layer becomes too rough and the A-particles are prevented from having their effect on the magnetic head, and if it is too small the effect thereof to lessen the pressure of contact between the cleaning tape and the magnetic head is lowered. The Mohs hardness of the B-particles should be not more than 5 and should preferably be not more than 4.

As B-particles can be used $CaCO_3$, $ZnO$, $Al_2O_3 \cdot 4SiO_2 \cdot H_2O$ (agalmatolite), $Al_2O_3 \cdot 2SiO_2 \cdot 2H_2O$ (kaolinite), $3CaO \cdot Al_2O_3 \cdot 3CaSO_4 \cdot 31H_2O$, $BaSO_4$ (natural barium sulfate, precipitated barium sulfate).

As the binder in which the A-particles and the B-particles are dispersed, various binders used in conventional magnetic tapes such as thermoplastic resins, thermosetting resins, reactive resins and mixtures of these resins can be used.

As the thermoplastic resins, various copolymers having a molecular weight of 10,000 to 200,000, a softening point of 150° C. and a polymerization degree of about 200 to 500 can be used. As the thermosetting resins and the reactive resins, there can be used various known resins having a molecular weight of not more than 200,000 in coating liquid form which is increased to infinity via a condensation or addition reaction when applied in a coat and dried. Further, among these resins, particularly preferred are resins which do not soften or melt until thermal decomposition takes place. The binder is composed of a single or several resins selected from the above described various kinds of resins. Further, to the resin or mixture of resins can be added such additives as a dispersing agent, lubricant and/or abrasive.

Specific examples of the thermoplastic resins are vinyl chloride-vinyl acetate copolymers, vinyl chloride-vinylidene chloride copolymers, vinyl chloride-acrylontrile copolymers, acrylic ester-acrylontrile copolymers, acrylic ester-vinylidene chloride copolymers, acrylic ester-styrene copolymers, methacrylic ester-acrylontrile copolymers, methacrylic ester-vinylidene chloride copolymers, methacrylic ester-styrene copolymers, urethane elastomers, e.g., of the thermosetting type such as those comprising a polyether / diamine group, a polyester / diamine group, a polyester / glycol group, a polyether / glycol group, etc., and of the thermoplastic type, e.g., polyvinyl fluoride, vinylidene chloride-acrylontrile copolymers, butadiene-acrylonitrile copolymers, polyamide resins, e.g., poly-condensates of the dicarboxylic acid and a diamine, polycondensates of $\omega$-aminocarboxylic acid aromatic polyamides, etc., polyvinyl butyral, cellulose derivatives (e.g., cellulose acetate butyrate, cellulose diacetate, cellulose triacetate, cellulose propionate, nitrocellulose), styrene-butadiene copolymers, polyester resins, e.g., polyethylene terephthalate, urethane rubber, polyurethane and the like, chloro-vinyl etheracrylic ester copolymers, various synthetic rubbers, e.g., BR (butadiene rubber), IR (isoprene rubber), CR (chloroprene rubber), ABR (acrylate butadiene rubber), IIR (isobutene-isoprene rubber), NBR (nitrile-butadiene rubber), NCR (nitrile-chloroprene rubber), PBR (pyridine-butadiene rubber), SBR (styrene-butadiene rubber), SCR (styrene-chloroprene rubber), SIR (styrene-isoprene rubber), etc. and mixtures thereof.

Specific examples of the thermosetting resins are phenol resins, epoxy resins, thermosetting polyurethane resins, urea-formaldehyde resins, melamine-formaldehyde resins, alkyd resins, silicone resins, acrylic functional resins, epoxy-polyamide resins, nitrocellulose-melamine resins, a mixture of a high molecular weight polyester resin with an isocyanate prepolymer, a mixture of a copolymer of methacrylic acid with a diisocyanate prepolymer, a mixture comprising a polyester-polyol and a polyisocyanate, a mixture comprising a low molecular weight glycol, a high molecular weight diol and triphenylmethane triisocyanate, a polyamine resin, mixtures thereof, etc.

The mixing weight ratio of the particles to the binder should be from 5:100 to 400:100, and more preferably be 50:100 to 200:100. If the ratio of the particles to the binder is too small, the cleaning effect is insufficient, and if it is too large the particles are apt to fall out of the cleaning layer. Further, the mixing weight ratio of A-particles to B-particles should be 1:100 to 100:1, and more preferably be 1:100 to 1:10.

The thickness of the cleaning layer should preferably be not more than $50\mu$. If the thickness is too great, the cleaning tape cannot be put into sufficient contact with the surface of the magnetic head.

Now the present invention will be described with reference to several examples thereof.

EXAMPLE 1

A cleaning layer of $10\mu$ thickness consisting of a coating liquid having composition (1) as described hereinbelow was applied on a substrate of PET having a thickness of $38\mu$. The tape thus prepared was slit into thin tapes of $\frac{1}{2}$ inch width. Four kinds of tapes having cleaning layers containing A- and B-particles both of different diameters were thus prepared and numbered as 1001 to 1004, which are shown in Table I. The cleaning tapes were loaded in a video tape recorder having a magnetic recording head bearing a magnetic material adhering thereto. Then, the time required for cleaning the magnetic head, the reproduction sensitivity, S/N ratio and the surface smoothness of the cleaned head were measured. The results of the test were as shown in Table I.

Composition (1)

| | |
|---|---|
| A-particles ($Cr_2O_3$) | 200 g |
| B-particles ($CaCO_3$) | 100 g |
| vinylchloride-vinylidene chloride copolymer (copolymerization ratio = 7 : 3, degree of | |

Composition (1)-continued

| | |
|---|---|
| polymerization = 400) | |
| epoxy resin (reaction product of bisphenol A and epichlorohydrine, molecular weight = 900, epoxy equivalent = 460-520, hydroxyl group content = 0.29%, Epicoat 1001 made by Shell Oil Co.) | 46.4 g |
| silicone oil (dimethylpolysiloxane) | 28.3 g |
| isocyanate compound (75 wt % of ethyl acetate solution of a reaction product of 3 mols of 2,4-tolylenediisocyanate and 1 mol of trimethylolpropane, Desmodur L-75 made by Bayer A.G) | 0.4 g |
| | 5.6 g |
| butyl acetate | 800 g |

EXAMPLE 2

Instead of composition (1), composition (2) as described hereinbelow was used to make a specimen No. 2001. The results were as shown in Table 1.

Composition (2)

| | |
|---|---|
| A-particles ($SiO_2$) | 50 g |
| B-particles (ZnO) | 250 g |
| vinylchloride-vinylidene chloride copolymer (copolymerization ratio = 87 : 13, degree of polymerization = 350) | 34.7 g |
| polyester polyol (reaction product of 1 mol of adipic acid, 1 mol of diethyleneglycol and 0.06 mol of trymethylolpropane, viscosity (at 75° C.) 1000 cp, specific gravity 1.18 OH-value 60, acid value < 2) | 21 g |
| soybean lecithin | 0.2 g |
| silicone oil (dimethylpolysiloxane) | 0.1 g |
| polyisocyanate (75 wt % of ethyl acetate solution of a reaction product of 3 mols of 2,4-tolylenediisocyanate and 1 mol of trimethylolpropane, Desmodur L-75 made by Bayer A.G) | 18 g |
| methyl ethyl keton | 400 g |
| toluene | 400 g |

EXAMPLE 3

The A- and B-particles in composition (1) were replaced by those shown in Table 1 at specimen No. 3001. The results were as shown in Table 1.

COMPARISON

In order to compare the results obtained by the clening tape containing two kinds of particles in accordance with this invention with those obtained by a cleaning tape containing only one kind of particles, specimens No. 4001 – 4003 employing A-particles only and specimens No. 5001 – 5002 employing B-particles only were prepared. Specimens No. 4001, 4003 and 5001 were prepared on the basis of the coating composition (1), and specimens No. 4002 and 5002 were prepared on the basis of the coating composition (2). The results obtained by these specimens are also shown in Table 1.

In Table 1, the measured factors are defined as follows.

(1) Time required for cleaning

The time required for cleaning the magnetic head to a degree of cleanness at which no dropout is observed in the reproduced image.

(2) Reproduction sensitivity and S/N ratio

Relative values in dB to an output (0dB) of 4 MHz measured before cleaning.

(3) Surface smoothness

The length of scratches on the magnetic tape played after cleaning were measured through microscopic observation. When the length of the scratching was 2μ or more, it was defined as "Scratching Observed". When the length was less than 2μ, it was defined as "None Observed".

The magnetic video tape used in the above tests was prepared by applying on a substrate of 22μ thickness a magnetic recording layer of 6.5μ thickness consisting of the following composition (3).

Composition (3)

| | |
|---|---|
| magnetic particles (γ-$Fe_2O_3$) (size 0.02μ×0.12μ, Hc : 2800e) | 300 g |
| vinylchloride-vinylidene chloride copolymer (copolymerization ratio = 87 : 13, degree of polymerization = 350) | 22.4 g |
| polyester polyol | 18.3 g |
| (reaction product of 1 mol of adipic acid, 1 mol of diethyleneglycol and 0.06 mol oftrymethylolpropane, viscosity (at 75° C.) 1000 cp, specific gravity 1.18 OH-value 60, acid value < 2) | |
| soybean lecithin | 1.2 g |
| silicone oil (dimethylpolysiloxane) | 0.4 g |
| polyisocyanate (75 wt. % of ethyl acetate solution of a reaction product of 3 mols of 2,4-tolylenediisocyanate and 1 mol of trimethylolpropane, Desmodur L-75 made by Bayer A.G) | 4.2 g |
| methyl ethyl keton | 400 g |
| toluene | 400 g |

TABLE 1

| Specimen No. | A-particles Material | A-particles Size (μ) | A-particles Mohs hardness | B-particles Material | B-particles Size (μ) | B-particles Mohs hardness | Time required for cleaning (sec) | Reproduction sensitivity (dB) | S/N (dB) | Scratching | Grade |
|---|---|---|---|---|---|---|---|---|---|---|---|
| 1001 | $Cr_2O_3$ | 0.8 | 6 | $CaCO_2$ | 30 | 3 | 3-5 | +0.8 | +0.5 | None | Good |
| 1002 | " | 0.01 | 6 | " | 30 | 3 | 40 | −0.8 | −1.4 | None | Good |
| 1003 | " | 0.8 | 6 | " | 250 | 3 | over 90 | −1.2 | −1.5 | None | Bad |
| 1004 | " | 7 | 6 | " | 30 | 3 | under 3 | −0.4 | −1.8 | Observed | Bad |
| 2001 | $SiO_2$ | 3 | 7 | ZnO | 100 | 4.5 | 3-10 | +0.9 | +0.6 | None | Good |
| 3001 | $Al_2O_3$ | 3 | 9 | ZnO | 100 | 4.5 | " | +0.8 | +0.7 | None | Good |
| 4001 | $Cr_2O_3$ | 0.8 | 6 | — | — | — | 3-5 | +0.1 | −1.4 | Observed | Bad |
| 02 | $SiO_2$ | 3 | 7 | — | — | — | " | −0.2 | −1.3 | " | Bad |
| 03 | $Al_2O_3$ | 3 | 9 | — | — | — | " | −0.2 | −1.6 | " | Bad |
| 5001 | — | — | — | $CaCO_2$ | 30 | 3 | over 120 | −2.3 | −2.6 | None | Bad |
| 02 | — | — | — | ZnO | 100 | 4.5 | " | −2.6 | −2.9 | None | Bad |

We claim:

1. A cleaning tape for cleaning the surface of a magnetic recording head of a magnetic tape recorder or the like comprising a flexible substrate and a cleaning layer disposed thereon, said cleaning layer containing two kinds of particles one of which has a diameter of not more than 5μ and Mohs hardness of not less than 5.5, and the other of which has a diameter of 6 to 200μ and Mohs hardness of not more than 5.

2. A cleaning tape as defined in claim 1 wherein the diameter of said one kind of particles is 0.1 to 1μ.

3. A cleaning tape as defined in claim 1 wherein the Mohs hardness of said one kind of particles is not less than 6.

4. A cleaning tape as defined in claim 1 wherein the diameter of said other kind of particles is 50 to 100μ.

5. A cleaning tape as defined in claim 1 wherein the Mohs hardness of said other kind of particles is not more than 4.

6. A cleaning tape as defined in claim 1 wherein said cleaning layer comprises a binder and said two kinds of particles are dispersed therein.

7. A cleaning tape as defined in claim 6 wherein the mixing weight ratio of said particles to the binder is within the range of 5:100 to 400:100.

8. A cleaning tape as defined in claim 7 wherein the mixing weight ratio of said particles to the binder is within the range of 50:100 to 200:100.

9. A cleaning tape as defined in claim 6 wherein the mixing weight ratio of said two kinds of particles is within the range of 1:100 to 100:1.

10. A cleaning tape as defined in claim 9 wherein the mixing weight ratio of said one kind of particles to said the other kind of particles is within the range of 1:100 to 1:10.

* * * * *